US008804684B2

(12) United States Patent
Persson et al.

(10) Patent No.: US 8,804,684 B2
(45) Date of Patent: Aug. 12, 2014

(54) METHODS AND ARRANGEMENTS FOR SCRAMBLING A TIMING ADVANCE VALUE IN A WIRELESS COMMUNICATION SYSTEM

(75) Inventors: Gunnar Persson, Vikingstad (SE); Benny Lennartson, Hägersten (SE); Lars-Göran Lund, Bromma (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 14/007,593

(22) PCT Filed: Mar. 29, 2011

(86) PCT No.: PCT/SE2011/050344
§ 371 (c)(1),
(2), (4) Date: Sep. 25, 2013

(87) PCT Pub. No.: WO2012/134359
PCT Pub. Date: Oct. 4, 2012

(65) Prior Publication Data
US 2014/0010218 A1    Jan. 9, 2014

(51) Int. Cl.
*H04J 3/16* (2006.01)
*H04W 56/00* (2009.01)
*H04W 64/00* (2009.01)

(52) U.S. Cl.
CPC ......... *H04J 3/1694* (2013.01); *H04W 56/0045* (2013.01); *H04W 64/00* (2013.01)
USPC ........... 370/338; 370/328; 370/336; 370/345; 370/350; 455/456.2

(58) Field of Classification Search
CPC ............................ H04W 56/0005; H04W 4/02
USPC .............. 455/456.2; 370/310, 328, 336, 338, 370/345, 350
See application file for complete search history.

(56) References Cited

U.S. PATENT DOCUMENTS 7,710,890 B2     5/2010  Klöppel et al.
2001/0036186 A1*  11/2001  O'Brien ....................... 370/395
(Continued)

FOREIGN PATENT DOCUMENTS

WO        2010093299 A1    8/2010

OTHER PUBLICATIONS

Bielsa, A., et al., "Outdoor and Indoor Location of Sensor Devices using GSM Cells and GPS", Article, Apr. 20, 2010, pp. 1-6, XP002667830, [retrieved on Aug. 7, 2013], retrieved from internet: http://www.libelium.com/outdoor-and-indoor-location-of-sensor-devices-using-gsm-cells-and-gps/.

*Primary Examiner* — Un C Cho
*Assistant Examiner* — Siming Liu
(74) *Attorney, Agent, or Firm* — Coats & Bennett, P.L.L.C.

(57) ABSTRACT

Methods and arrangements (600) in a network node (110), for scrambling a timing advance value, to be received by a mobile station (120). The method comprises receiving (501) a signal from the mobile station (120), estimating (504) the timing advance value for the mobile station (120), determining (505) an offset value to be added to the estimated timing advance value, computing (506) a scrambled timing advance value by adding the determined offset value to the estimated timing advance value, and transmitting (507) the scrambled timing advance value, to be received by the mobile station (120). Also, methods and arrangements (800) in a mobile station (120), and methods and arrangements (1000) in a database (140) are disclosed.

18 Claims, 10 Drawing Sheets

(56) References Cited

U.S. PATENT DOCUMENTS

| | | | |
|---|---|---|---|
| 2004/0151143 A1* | 8/2004 | Abdesselem et al. | 370/336 |
| 2005/0148340 A1* | 7/2005 | Guyot | 455/456.2 |
| 2006/0030333 A1* | 2/2006 | Ward et al. | 455/456.1 |

* cited by examiner

Move TDMA-frame structure to the "left" to establish a general TA offset for all channels of the RBS

METHODS AND ARRANGEMENTS FOR SCRAMBLING A TIMING ADVANCE VALUE IN A WIRELESS COMMUNICATION SYSTEM

TECHNICAL FIELD

The present disclosure relates to a method in a network node, an arrangement in a network node, a method in a mobile station, an arrangement in a mobile station, a method in a database and an arrangement in a database. Particularly, it relates to scrambling a timing advance value at the network node, to be received by the mobile station.

BACKGROUND

Mobile Stations (MS), also known as mobile terminals, wireless terminals and/or User Equipment (UE) are enabled to communicate wirelessly in a wireless communication system, sometimes also referred to as a cellular radio system. The communication may be made e.g. between two mobile stations, between a mobile station and a regular telephone and/or between a mobile station and a server via a Radio Access Network (RAN) and possibly one or more core networks.

The mobile stations may further be referred to as mobile telephones, cellular telephones, laptops with wireless capability. The mobile stations in the present context may be, for example, portable, pocket-storable, hand-held, computer-comprised, or vehicle-mounted mobile devices, enabled to communicate voice and/or data, via the radio access network, with another entity, such as another mobile station or a server.

The wireless communication system covers a geographical area which is divided into cell areas, with each cell area being served by a base station, e.g. a Radio Base Station (RBS), which in some networks may be referred to as "eNB", "eNodeB", "NodeB" or "B node", depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells. The base stations communicate over the air interface operating on radio frequencies with the mobile stations within range of the base stations.

In some radio access networks, one or more base stations may be connected, e.g. by landlines or microwave, to a Radio Network Controller (RNC) e.g. in Universal Mobile Telecommunications System (UMTS). The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

When a mobile station desires to access a GSM system, it begins by sending random-access bursts to the nearest/strongest radio base station. Depending on the distance to the radio base station the bursts will arrive at the radio base station more or less out of sync with the TDMA-frame structure of the radio base station. To get the mobile station aligned with the TDMA frames the initial response from the GSM system contains a Timing Advance (TA) value. The timing advance value informs the mobile station of how much earlier the mobile station must transmit its bursts for them to arrive well synchronized to the radio base station.

As the timing advance value reflects the geographical distance between the mobile station and the radio base station, this information may be used for positioning purposes. With several known timing advance values from different radio base stations it is possible to triangulate the mobile station position. That is, provided that the positions of the radio base stations are also known. GSM networks provide positioning features based on timing advance triangulating technology.

In recent years, a new vicious variant of timing advance positioning started to spread. Mobile stations accordingly make fake accesses in the GSM radio cells without intention to establish a session. Instead they just note the timing advance values that are included in the initial responses from the system. They never establish on the signalling channel provided by the system. Hence, the channel is "hanging" until system timeouts and sets it back to idle state.

The timing advance values that have been snatched from the system are used by the mobile station, together with the Cell Global Identities (CGIs) of the radio base stations, to find out its geographical position. To do this the mobile station may use any Internet Protocol (IP) connection to contact a server that has knowledge about the radio base stations locations. The timing advance/cell global identity values are traded for the geographical position and at the same time the server gets valuable information to fine tune its database.

GSM operators have increasing problems with mobile terminals that use the described positioning method based on fake system accesses. The GSM systems cannot distinguish the fake-positioning accesses from real accesses. The reason for this is that they use an establishment-cause value that may be used also for normal traffic cases. Therefore, the system must allocate a signalling channel for every fake random access that is received. The system impact is a waste of radio resources, limiting the amount of real traffic that may be processed by the system.

Also, the system must consider each failure caused by fake accesses as a real establishment failure. This corrupts the performance indicators and therefore the operators have problems to supervise the performance of their networks.

A problem for the operators is that they do not get paid for the cost of the positioning activities. As the mobile stations do not reveal any identity when making the fake accesses, there is no way to charge those activities. Indirectly they might get paid when the mobile station terminals use packet switched signalling to contact the positioning server. However, this contact may be made through other available IP connections like direct Local Area Network (LAN) or Wireless Local Area Network (WLAN) connection, or WiFi. In a case when the mobile station does already know the location of the radio base stations, it does not even need to contact any server to find out the position.

SUMMARY

It is an object to obviate at least some of the above disadvantages and provide an improved performance within a wireless communication system.

According to a first aspect, the object is achieved by a method in a network node. The method aims at scrambling a timing advance value to be received by a mobile station. The method comprises receiving a signal from the mobile station. Based on the geographical distance between the network node and the mobile station, the timing advance value for the mobile station is estimated. Further, an offset value to be added to the estimated timing advance value is determined. The determined offset value may be depending on the available value range at the network node. Thereby is it rendered possible to compute a scrambled timing advance value, by adding the determined offset value to the estimated timing advance value. The scrambled timing advance value is then transmitted, to be received by the mobile station.

According to a second aspect, the object is achieved by an arrangement in a network node for scrambling a timing advance value, to be received by a mobile station. The arrangement comprises a receiver. The receiver is configured to receive a signal from the mobile station. Further, the arrangement also comprises a processing circuit. The processing circuit is configured to determine an offset value to be added to the estimated timing advance value. The determined offset value may be depending on the available value range at the network node. In addition, the processing circuit is configured to compute a scrambled timing advance value by adding the determined offset value to the estimated timing advance value. Furthermore, the arrangement also comprises a transmitter. The transmitter is configured to transmit the scrambled timing advance value to the mobile station.

According to a third aspect, the object is achieved by a method in a mobile station. The method aims at utilizing a scrambled timing advance value received from a network node. The received scrambled timing advance value may be utilized for determining geographical position of the mobile station. The method comprises transmitting a signal, to be received by the network node. Further, the method also comprises receiving a scrambled timing advance value comprising an offset value added to a timing advance value from the network node. Also, in addition, the method further comprises determining the position of the mobile station, based on the scrambled timing advance value.

According to a fourth aspect, the object is achieved by an arrangement in a mobile station, configured to utilize a scrambled timing advance value, received from a network node. The received scrambled timing advance value may be utilized for determining geographical position of the mobile station. The arrangement comprises a transmitter. The transmitter is configured to transmit a signal to be received by the network node. Further, the arrangement comprises a receiver. The receiver is configured to receive a scrambled timing advance value comprising an offset value added to a timing advance value, from the network node. Additionally, the arrangement furthermore comprises a processing circuit. The processing circuit is configured to determine the position of the mobile station, based on the scrambled timing advance value.

According to a fifth aspect, the object is achieved by a method in a database. The method aims at providing an original timing advance value, and/or a position of a mobile station, to the mobile station. The method comprises receiving an offset value, associated with a network node. The offset value may be depending on the available value range at the network node. Further, the method comprises storing the received offset value. In addition, the method comprises receiving a request for converting a scrambled timing advance value into the original timing advance value, from the mobile station. Also, in further addition, the method comprises computing the original timing advance value by subtracting the stored offset value associated with the network node from the scrambled timing advance value received from the mobile station, and/or computing the position of the mobile station based on the original timing advance value. The computed original timing advance value and/or computed position of the mobile station is then transmitted to the mobile station.

According to a sixth aspect, the object is achieved by an arrangement in a database, configured to provide an original timing advance value, and/or a position of a mobile station, to the mobile station. The arrangement comprises a receiver. The receiver is configured to receive an offset value, associated with a network node. The offset value may be depending on the available value range at the network node. Further, the receiver is configured to receive a request for converting a scrambled timing advance value into the original timing advance value from the mobile station. Also, the arrangement further comprises a processing circuit. The processing circuit is configured to compute the original timing advance value by subtracting the stored offset value associated with the network node from the scrambled timing advance value received from the mobile station, and/or to compute the position of the mobile station, based on the original timing advance value. Additionally, the arrangement also comprises a memory, configured to store the received offset value. The arrangement in further addition also comprises a transmitter, configured to transmit the computed original timing advance value, and/or computed position of the mobile station, to the mobile station.

Embodiments of the methods and arrangements herein, thanks to the distinguishing features of the independent claims, render it impossible, or at least inconvenient for a (non-authorized) mobile station to make fake network access attempts, merely to use timing advance values received from the base station. The reason according to some embodiments is that cells not utilising all their value range may be identified, and an offset that is not known by the (non-authorized) mobile station has been added to the normal timing advance value at these cells, thereby generating a scrambled timing advance value. Thus it may be expected that the previously known problem with snatched timing advance-positioning will fade out. Thereby is it rendered possible to use currently wasted radio resources again by other users for establishing real communication within the system. It may further, according to some embodiments be easier for the operators to supervise the performance of their mobile networks when the deliberate failure have ceased, as the mere positioning accesses where no allocated channel is really used by the mobile station according to the state of the art may be counted as a connectivity failure. According to some embodiments, the offset value may be known and updated by the operator for each involved network node. This information concerning updated offset values thus become valuable information that may be used commercially e.g. by selling such information to authorized mobile stations. Further, according to some embodiments, if the network node is aware that no resources are to be allocated to a certain mobile station, the timing advance value may be determined with higher precision, i.e. by using more bits when defining it.

Thereby is an improved performance within the wireless communication system provided.

Other objects, advantages and novel features will become apparent from the following detailed description.

BRIEF DESCRIPTION OF THE DRAWINGS

The methods and arrangements are described in more detail with reference to the appended drawings, illustrating exemplary embodiments and in which.

DETAILED DESCRIPTION

It is herein disclosed a method in a network node, an arrangement in a network node, a method in a mobile station, an arrangement in a mobile station, a method in a database and an arrangement in a database, which may be put into practice in the embodiments described below. Those methods and arrangements may, however, be embodied in many different forms and are not to be considered as limited to the embodiments set forth herein; rather, these embodiments are provided so that this disclosure will be thorough and complete.

Still other features and advantages of embodiments of the methods and arrangements may become apparent from the following detailed description considered in conjunction with the accompanying drawings. It is to be understood, however, that the drawings are designed solely for purposes of illustration and not as a definition of the limits of the methods and arrangements. It is further to be understood that the drawings are not necessarily drawn to scale and that, unless otherwise indicated, they are merely intended to conceptually illustrate the structures and procedures described herein.

Figure 1:
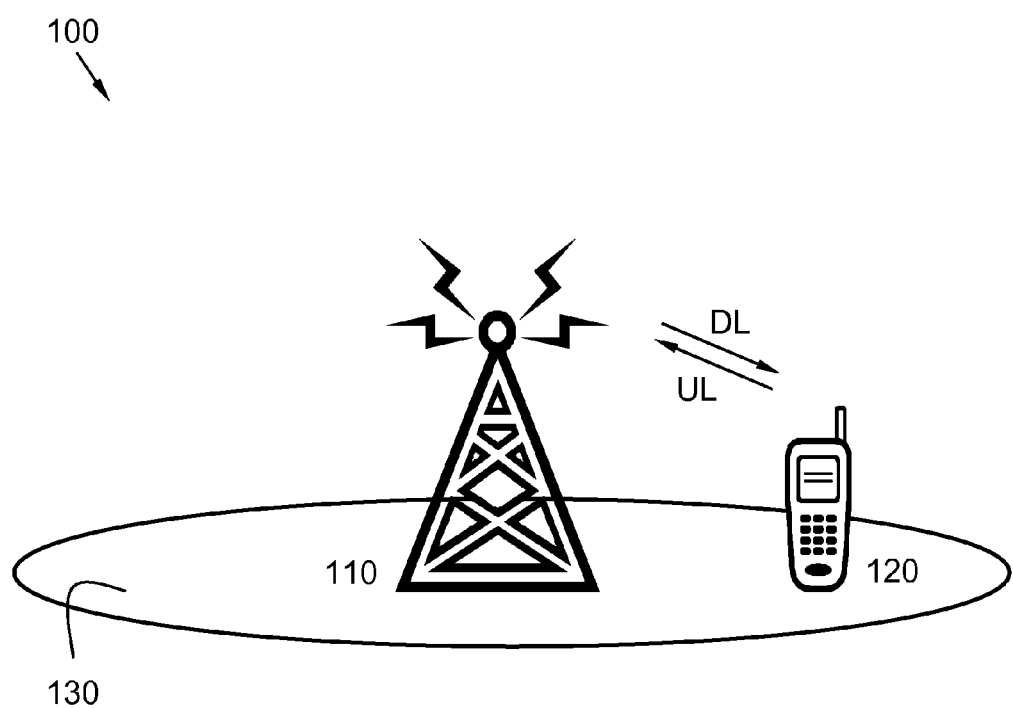
FIG. 1 is a schematic block diagram illustrating a wireless communication system according to some embodiments.

FIG. 1 depicts a wireless communication system 100, such as e.g. a GSM based system.

The wireless communication system 100 may however, according to some embodiments, at least partly be based on radio access technologies such as e.g. 3rd Generation Partnership Project (3GPP) Long Term Evolution (LTE), LTE-Advanced, Evolved Universal Terrestrial Radio Access Network (E-UTRAN), UMTS, GSM/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), just to mention some few options.

The wireless communication system 100 may be configured to operate according to the Time Division Duplex (TDD) and/or the Frequency Division Duplex (FDD) principle, according to different embodiments.

TDD is an application of time-division multiplexing to separate uplink and downlink signals in time, possibly with a guard period situated in the time domain between the uplink and downlink signalling. FDD means that the transmitter and receiver operate at different carrier frequencies.

The purpose of the illustration in FIG. 1 is to provide a simplified, general overview of embodiments of the methods and the functionalities involved. The present methods and arrangements will be described in a GSM environment, as a non-limiting example.

The wireless communication system 100 comprises a network node 110, and a mobile station 120, arranged to communicate with each other. The mobile station 120 is situated in a cell 130, defined by the network node 110. The mobile station 120 is configured to transmit radio signals comprising information data to be received by the network node 110. Contrariwise, the mobile station 120 is configured to receive radio signals comprising information data transmitted by the network node 110.

The expression downlink (DL) is used for the transmission path from the base station 110 to the mobile station 120. The expression uplink (UL) is used for the transmission path in the opposite direction i.e. from the mobile station 120 to the base station 110.

The transmission of signals between the mobile station 120 and the base station 110 may be made on a carrier. Carrier frequencies may further be subdivided into time slots. For example, Time Division Multiple Access (TDMA) has 8 time slots i.e. each time slot transmitting for one eighth of the time.

It is to be noted that the illustrated setting of network nodes 110 and mobile stations 120 in FIG. 1 is to be regarded as a non-limiting exemplary embodiment only. The wireless communication system 100 may comprise any other number and/or combination of network nodes 110 and or mobile stations 120. For example may the network node 110 be connected to, or comprise, a base station controller (BSC), according to some embodiments. The base station controller may e.g. handle allocation of radio channels, receive measurements from the mobile stations 120, and control handovers to and/or from the network node 110, to mention some possible examples. Such base station controller may be connected to a plurality of network nodes 110 within the wireless communication system 100. Further, a radio base station and base station controller may both, or together, be referred to as a network node 110 within the context of the herein described methods and arrangements.

The network node 110 may be referred to as e.g. Radio Base Station (RBS), base station, NodeB, evolved Node B (eNB, or eNode B), base transceiver station, Access Point Base Station, base station router, macro base station, micro base station, pico base station, femto base station, Home eNodeB, relay and/or repeater, sensor, beacon device or any other network node configured for communication with the mobile station 120 over a wireless interface, depending e.g. of the radio access technology and terminology used. In the rest of the disclosure, the term "network node" will be used for the network node 110, in order to facilitate the comprehension of the methods.

The mobile station 120 may be represented by e.g. a wireless communication terminal, a mobile cellular phone, a Personal Digital Assistant (PDA), a wireless platform, a user equipment unit (UE), a portable communication device, a laptop, a computer or any other kind of device configured to communicate wirelessly with the network node 110.

The network node 110 controls the radio resource management within the cell 130, such as e.g. allocating radio resources to the mobile station 120 within the cell 130 and ensuring reliable wireless communication links between the network node 110 and the mobile station 120.

Embodiments of the methods and arrangements aim at discouraging any non-authorized or non-permitted snatching method of timing advance positioning.

This may be achieved according to some embodiments by adding an offset value to the estimated timing advance value, before sending it to the mobile station 120, as a response to an access attempt.

Further, some embodiments of the methods and arrangements herein described aim at providing an improved timing advance positioning for authorised users/mobile stations 120.

Thus, enhanced support for positioning using timing advance may be provided for certain mobile station 120 by sending a unique establishment-cause value to the network node 110. When the network node 110 receives and recognises the unique establishment-cause value, it is recognised that the mobile station 120 only wants to receive a timing advance value. The network node 110 may then avoid allocating resources to that mobile station 120. Also, the network node 110 may avoid sending signalling information related to the establishment of a channel, as such information becomes redundant. Instead, extra bits may be used for transmitting timing advance value to the mobile station 120 more exactly, which may render an improved position estimation by the mobile station 120, based on the more precise timing advance value received from the network node 110.

Thereby is redundant allocation of resources avoided, which render an improved system performance. Further, the mobile station 120 may estimate the position more exactly based on a more precise timing advance value received from the network node 110.

According to some embodiments is the provided timing advance information scrambled, while keeping the essential function of keeping the mobile stations 120 synchronised with the Time Division Multiple Access (TDMA) frames of the network node 110.

Figure 2A:
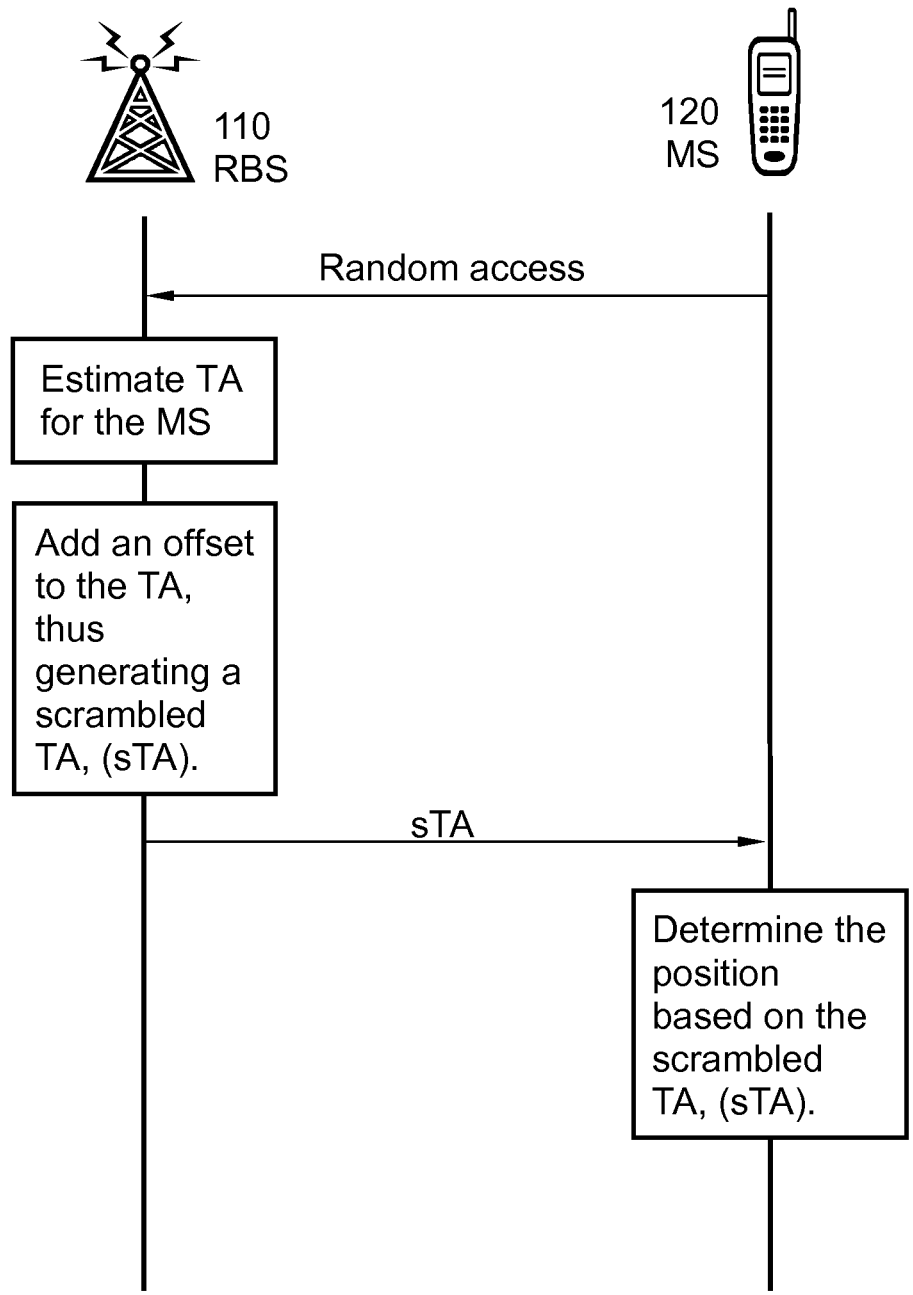
FIG. 2A is a combined block diagram and flow chart illustrating an exemplary embodiment within a wireless communication system.

FIG. 2A is a combined block diagram and flow chart illustrating an embodiment within the wireless communication system 100. The method aims at avoiding/discouraging the mobile station 120 from making fake access attempts to a network node 110, merely in order to utilize the timing advance for positioning purposes.

The method may comprise a number of actions, in order to efficiently discourage non-authorized mobile stations 120 from making fake access attempts to a network node 110 in order only to utilize the timing advance for positioning purposes in the wireless communication system 100. The actions may be performed in a somewhat different order than the herein utilised order of appearance, which is merely exemplary according to different embodiments. Also, further actions may be performed within some embodiments, which are also discussed in conjunction with FIG. 2B.

The mobile station 120 makes a random access call to the network node 110. At this point, it is not possible to know if the mobile station 120 actually wants to access the network, or just want to receive a timing advance value for positioning purpose.

The network node 110, upon receiving the random access from the mobile station 120 may then estimate the timing advance for the mobile station 120.

The timing advance value, as briefly mentioned before, represents the geographical distance between the network node 110 and the mobile station 120, but corresponds to the length of time a signal takes to be transmitted from the network node 110, reach the mobile station 120 and be transmitted back, from the mobile station 120 to the network node 110.

According to some embodiments e.g. within GSM, TDMA technology may be utilized in the radio interface to share a single frequency between several mobile stations 120, assigning sequential timeslots to the individual mobile station 120 sharing a frequency. Each mobile station 120 may then transmit periodically for less than one-eighth of the time within one of the eight timeslots. Since the mobile stations 120 sharing a frequency may be situated at various distances from the network node 110 and radio waves travel at the finite speed of light, the precise arrival-time within the slot may be used by the network node 110 to determine the distance to the mobile station 120. The time at which the mobile station 120 is allowed to transmit a burst of traffic within a timeslot must be adjusted accordingly to prevent collisions with adjacent mobile stations 120. Timing advance is the variable controlling this adjustment.

The timing advance value is normally between 0 and 63, with each step representing an advance of one bit period, which may be approximately 3.69 microseconds, according to some embodiments. With radio waves travelling at the speed of light (about 299,792,458 meters per second), one timing advance step then represents a change in round-trip distance (i.e. twice the propagation range between the network node 110 and the mobile station 120) of about 1,100 meters. This means that the timing advance value changes for each 550-meter change in the range between the mobile station 120 and the network node 110. This limit of 63×550 meters is the maximum 35 kilometers that the mobile station 120 may be situated from the network node 110 and is the upper bound on cell placement distance. However, in reality, and in particular in populated areas, network nodes 110 are situated more densely than that. Thus, not all hypothetically available (0-63) timing advance values may be utilized in the cell 130.

The radio cell 130, defined by the network node 110, thus may have a maximum number of allowed or utilized timing advance values that is less of the maximum range specified for GSM, i.e. 63.

The lower setting of the maximum timing advance within the cell 130, the more freedom is available for the present method to operate. Such "freedom" may be referred to as TAOR (Timing Advance Offset Range). For the radio cell 130, TAOR may be calculated as TAOR=63−"Maximum timing advance in the cell 130".

As a non-limiting example, the network node 110 may have 30, as a maximum number of allowed or utilized timing advance values. The available offset, or TAOR, may then become: TAOR=63−30=33

An offset value to be added to the estimated timing advance value may then be determined, which offset value may be selected between 1 and the TAOR; in the mentioned example between 1 and 33. The selection may be made e.g. by picking a value from a look-up table, database or similar, with a certain periodicity.

A scrambled timing advance value may then be computed by adding the determined offset value to the estimated timing advance value.

The scrambled timing advance value may then be sent to the mobile station 120.

If the non-authorized mobile station 120 then tries to determine the position based on the scrambled timing advance value received from the network node 110, the rendered position indication will become so erroneous, depending on the size of the added offset, that the non-authorized mobile station 120 finds it useless for positioning. However, the mobile station 120 may anyway use the scrambled timing advance value for timing/signalling purpose instead of the original, non-scrambled timing advance value.

It may also be mentioned that the mobile station 120 when trying to determine the position based on the scrambled timing advance value received from the network node 110 typically collects timing advance values from a number of network nodes, and then tries to calculate the position by performing trigonometric calculations.

Thereby, the disclosed methods discourage from positioning the non-authorized mobile station 120 but without hindering any access to the wireless communication system 100.

Figure 2B:
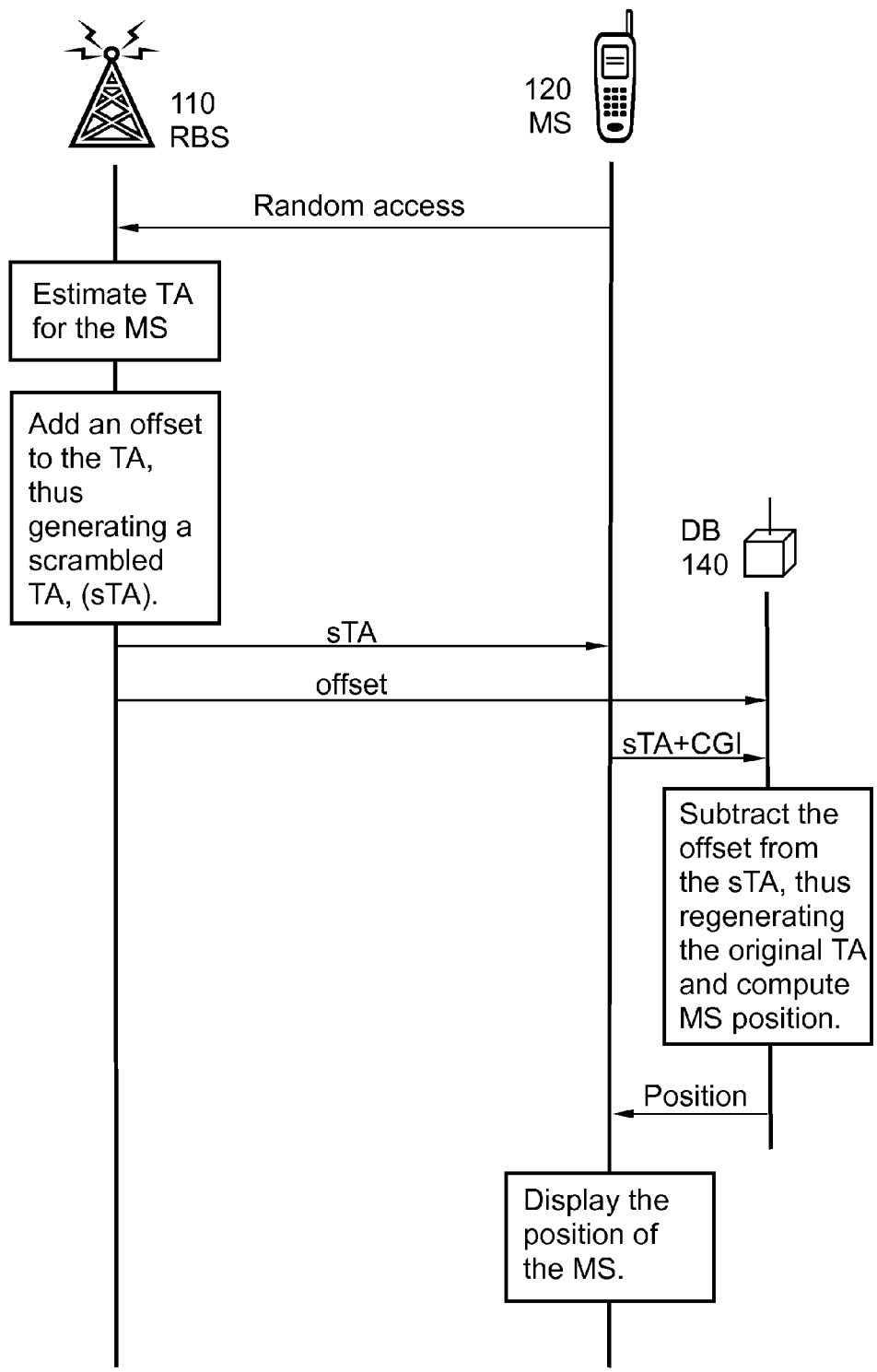
FIG. 2B is a combined block diagram and flow chart illustrating an exemplary embodiment within a wireless communication system.

FIG. 2B is a combined block diagram and flow chart illustrating an embodiment within the wireless communication system 100. The method aims at avoiding/discouraging the non-authorized mobile station 120 from making fake access attempts to a network node 110 in order only to utilize the timing advance for positioning purposes, while at the same time providing an improved positioning for the authorized mobile station 120.

After having performed at least some of the actions as previously described in conjunction with FIG. 2A, the network node 110 may transmit and/or store the offset in a database 140.

The mobile station 120, upon receiving the scrambled timing advance value from the network node 110, may according to some embodiments request the original timing advance value associated with the particular network node 110 from the database 140. Alternatively may the mobile station 120 request the computed position from the database 140, based on the original timing advance value. Such request may comprise an identification and/or authentication process in order to be successful. Thus a check may be performed, checking if the mobile station 120 is authorized to receive the original timing advance value and/or position of the mobile station 120, from the database 140. Also, the mobile station 120 may provide the scrambled timing advance value to the database 140, and an identification of the network node 110, such as a CGI, e.g. together with the request.

After a successful check of authorization, the database 140 may compute the original timing advance value by subtracting the offset value from the scrambled timing advance value. Further, the database 140 may send the requested original timing advance value, associated with the network node 110, and/or the position of the mobile station 120, to the mobile station 120.

When the mobile station 120 receives the original timing advance value from the database 140, the position of the mobile station 120 may be determined, based on the original timing advance value, according to some embodiments, in case not the already computed position of the mobile station 120 is received from the database 140.

In order to compute the position of the mobile station 120, in the mobile station 120, or in the database 140, trigonometrical computations involving timing advance values received from a plurality of network nodes 110, and the establishment of the geographical positions of these network nodes 110 may be performed.

Figure 3A:
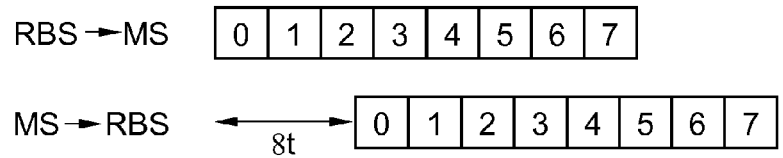
FIG. 3A is a schematic block diagram illustrating a frame structure according to some embodiments.

FIG. 3A is a schematic block diagram illustrating an embodiment of a TDMA-frame.

All mobile station 120 served by the network node 110 get their TDMA-frame synchronization by listening to the downlink frames transmitted by the network node 110. To give the mobile station 120 time enough to switch between receiving and transmitting there is hard coded system defined time offset (8t) between the downlink and uplink frame structure, as illustrated in FIG. 3A.

The mobile station 120 may synchronize with the downlink frames and transmits uplink with the objective to map to the relevant TDMA slot when received by the network node 110. Unless the mobile station 120 is just beside the network node 110, each mobile station 120 may transmit its uplink bursts a bit in advance, i.e. the timing advance, to compensate for the distance to the network node 110. The network node 110 monitors the sync of each mobile station 120 in communication and may continuously give them updates of which timing advance value to use, respectively.

Figure 3B:
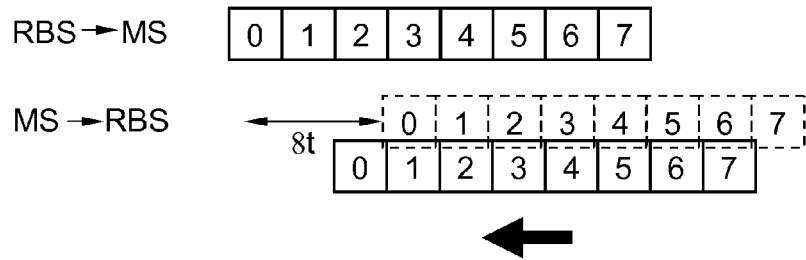
FIG. 3B is a schematic block diagram illustrating a frame structure according to some embodiments.

FIG. 3B is a schematic block diagram illustrating an embodiment of a TDMA-frame according.

According to embodiments of the herein disclosed methods, it becomes inconvenient, difficult and/or even impossible to snatch timing advance values from a wireless communication system 100 and utilize for positioning purpose.

For radio cells 130 that do not need to utilize the full timing advance range of 0-63, it is be possible to add an offset to the timing advance values. To add an offset to the timing advance value may render it impractical, or even impossible for the mobile station 120 to know the real distance to the network node 110.

A non-limiting, purely illustrative example will now be presented:

Assume the cell 130 has a maximum used timing advance of 50. For the cell 130, this signifies that the used timing advance range would normally be between 0-50. Thus the used timing advance value may be 0 if the mobile station 120 is situated adjacent to the network node 110, and 50 if the mobile station 120 is situated at the cell border, just to mention an example.

However, by adjusting the network node 110 so that the whole uplink TDMA-frame structure is moved "to the left" the required timing advance-value range would change from 0-50 to 1-51 to 2-52 and up to maximum offset 13-63, as schematically illustrated in FIG. 3B.

Figure 4:
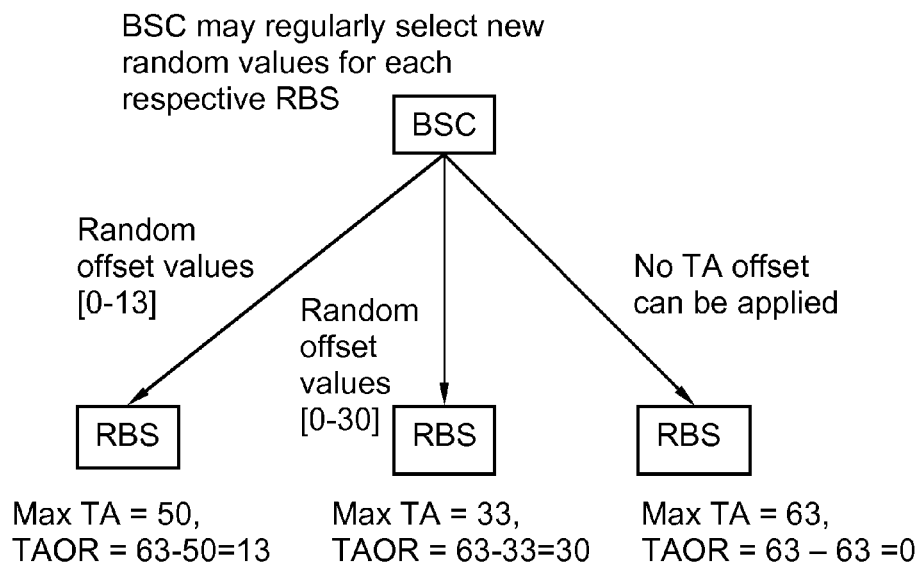
FIG. 4 is a schematic block diagram illustrating a schematic overview of an exemplary embodiment in a wireless communication system.

FIG. 4 is a block diagram illustrating a schematic overview of an exemplary embodiment in the wireless communication system 100. In the illustrated non-limiting example, a base station controller selects new offset values for each respective radio base station.

As the cell 130 defined by each respective radio base station 110 may have different size, also the maximum used timing advance value is different, which render a differently sized offset value range to select from, as illustrated in FIG. 4.

The selection within each respective offset value range may be made e.g. randomly and updated at regular intervals, or at randomly determined intervals, irregular time intervals, according to different embodiments.

Figure 5:
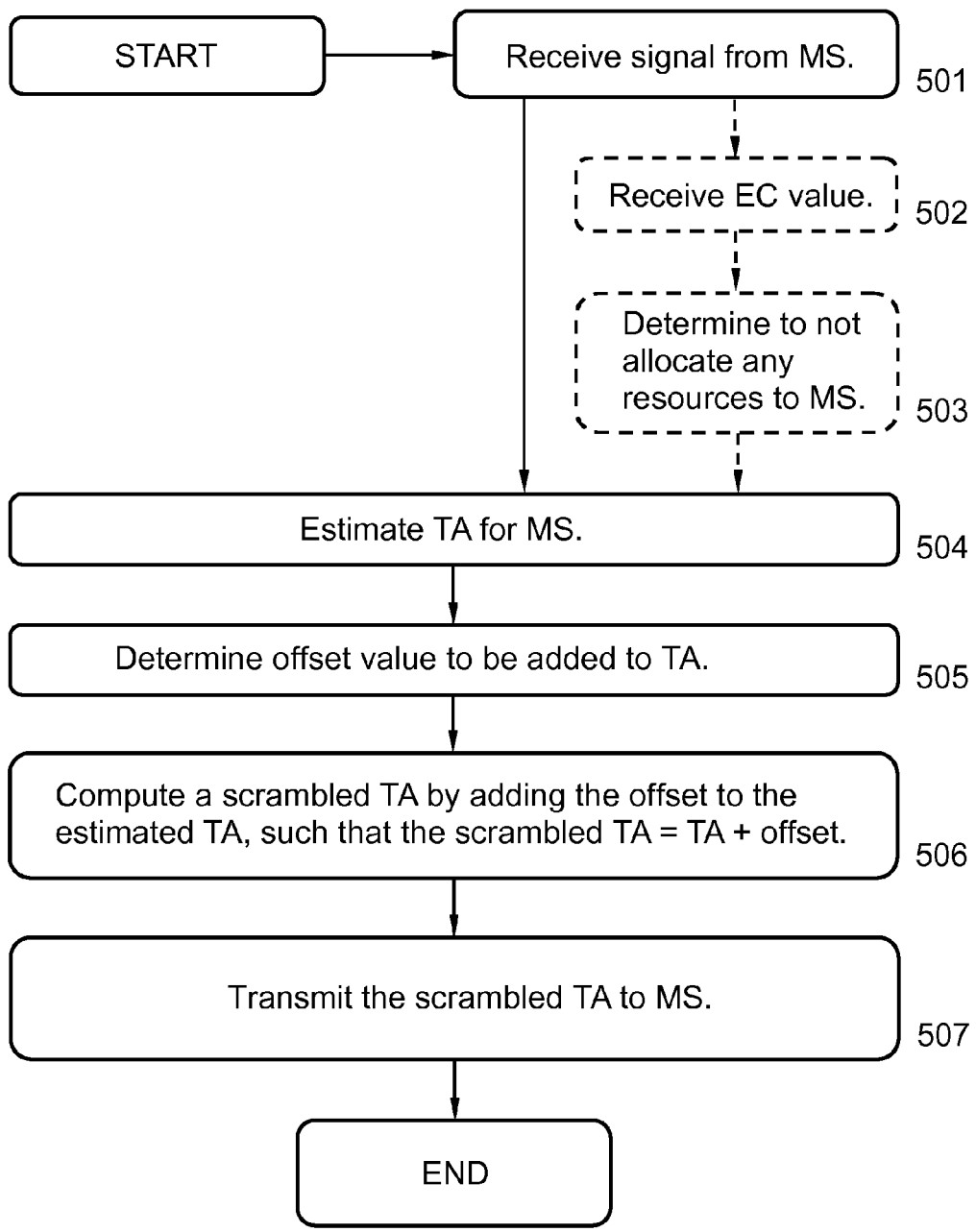
FIG. 5 is a schematic block diagram illustrating a method in a network node in a wireless communication system according to some embodiments.

FIG. 5 is a schematic block diagram illustrating an embodiment of the method in a network node 110, regarded in perspective of the network node 110. The network node 110 may be represented by a radio base station or the like, or even by a radio base station in conjunction with a base station controller, according to some embodiments wherein some actions may be performed by the base station controller, such as e.g. computations, and some actions by the radio base station, such as e.g. sending and receiving signals.

The method aims at scrambling a timing advance value, to be received by a mobile station 120. The purpose according to some embodiments is to discourage any non-authorized mobile station 120 from making fake access attempts to the network node 110, merely for positioning purpose, i.e. for receiving timing advance values and then determine the geographical position based on one or more such value. Further, embodiments of the method may provide an improved privacy of the (user of the) mobile station 120, against (non-authorized) tracking software, attempting to plot the geographical position of the mobile station 120, without the user's knowledge. In addition, embodiments of the method may provide an improved geographical positioning service for authorized mobile station 120. The network node 110 and the mobile station 120 may be comprised in a wireless communication system 100, wherein the network node 110 may act as serving base station for the mobile station 120.

The method may comprise a number of actions 501-507, in order to efficiently scrambling a timing advance value to be received by a mobile station 120, within the wireless communication system 100. The actions may be performed in a somewhat different chronological order than the enumeration indicates, according to different embodiments. Further, it is to be noted that some of the actions, indicated by dashed lines in FIG. 5, are comprised within some alternative embodiments. Any, some or all actions, such as e.g. 504 and 505 may be performed simultaneously or in a rearranged chronological order. The method may comprise the following actions:

Action 501

A signal is received from the mobile station 120. The signal may comprise e.g. an access signal or a random access burst.

According to some embodiments, the same resource may be allocated to mobile stations 120 attempting to access the network node 110, until it is verified that the allocated resource is actually utilized. Thereby may the risk of allocating resources in vain be minimised or at least somewhat reduced.

Action 502

This action may be performed within some alternative embodiments.

An establishment-cause value, dedicated for mobile station positioning without access request, may be received from the mobile station 120.

By adding a new specified unique establishment-cause value, to be used by the mobile station 120 when making fake accesses for positioning purpose, redundant allocation of system resources may be avoided. Also, as the mobile station 120 in such positioning scenario has no need for a radio channel the initial message from the system (Immediate Assignment Command) may be updated to contain data that is more useful for the positioning purpose. For example the timing advance value may be provided with a better resolution than today, according to some embodiments.

Thereby, according to some embodiments, an enhanced support for positioning based on timing advance may be provided.

Action 503

This action may be performed within some alternative embodiments, upon reception and/or detection of the establishment-cause value, it may be determined that no connection attempt is being performed by the mobile station 120 and refrain from allocating resources to the mobile station 120.

If the mobile station 120, authorized or not, only access the network for attempting to get the timing advance value for positioning, it is a waste of resources to allocate a channel for the mobile station 120, as any such allocated resource will not be utilized. By transceiving the establishment-cause value between the mobile station 120 and the network node 110, and detecting such establishment-cause value at the network node 110, it may be avoided to allocate resources to that mobile station 120. Thus system resources are saved, rendering an improved wireless communication system 100.

According to some embodiments, upon detection of the dedicated establishment-cause value, the timing advance value for the mobile station 120 may be estimated using more than 6 bits, enabling at least 65 distinct timing advance values.

According to some embodiments, no signalling information may thus be sent to the mobile station 120. Thereby more bits may be used for sending a timing advance value with higher resolution to the mobile station 120. Thereby may also the position of the mobile station 120 be determined with higher resolution.

Action 504

The timing advance value for the mobile station 120 is estimated.

As previously discussed, the timing advance value for the mobile station 120 is estimated based on the geographical distance between the mobile station 120 and the network node 110.

Action 505

An offset value to be added to the estimated timing advance value is determined.

According to some embodiments may the same offset value be utilized for scrambling the timing advance values for all mobile stations 120 within the cell 130 defined by the network node 110.

The determination of the offset value may according to some embodiments further comprise determining the maximum timing advance value used within the cell 130. Also, an offset range may be obtained by subtracting the determined maximum timing advance value from a predetermined value, such as e.g. 63, and determine the offset value to be an integer between 1 and the upper limit of the offset range.

The determination of the offset value may according to some embodiments further comprise determining the offset value randomly, to be valid for a period of time. The period of time may comprise e.g. a predetermined regular time interval, or randomly changed irregular time periods.

The same offset value may be utilized for all mobile stations 120 within the cell 130, according to some embodiments. Further, the same offset value may be utilized for a certain period of time, e.g. a week, a month etc. so the update of the offset value does not have to be made for every new access attempt. Thus processing power may be saved and the risk of having an already connected mobile station 120 transmitting on an "old" offset timing advance value may be somewhat reduced.

Action 506

A scrambled timing advance value is computed by adding the determined offset value to the estimated timing advance value.

Action 507

The scrambled timing advance value is transmitted, to be received by to the mobile station 120.

Figure 6:
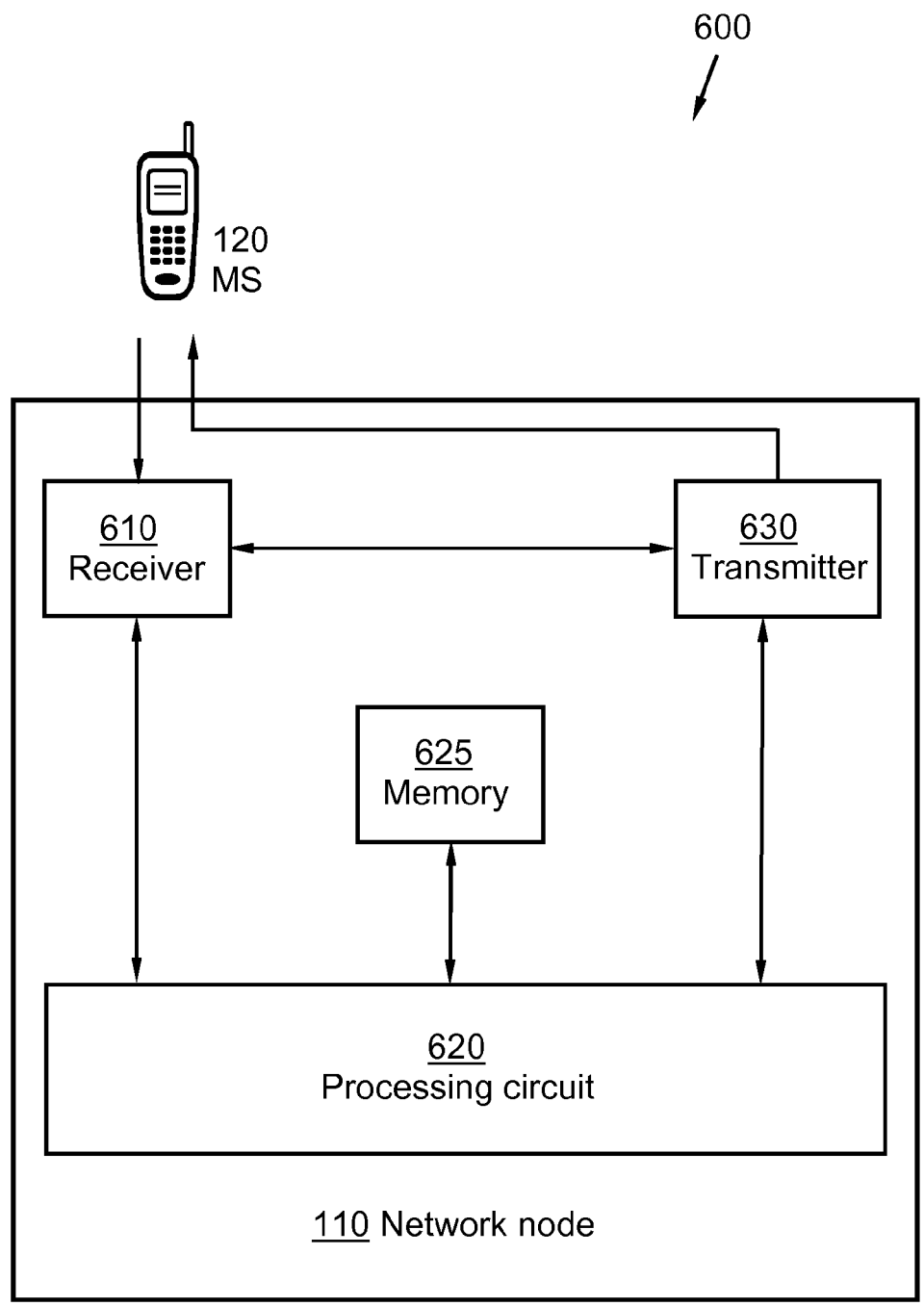
FIG. 6 is a schematic block diagram illustrating an arrangement in a network node in a wireless communication system according to some embodiments.

FIG. 6 is a schematic block diagram illustrating an arrangement 600 in a network node 110. The network node 110 may be represented by a radio base station or the like, or even by a radio base station in conjunction with a base station controller, according to some embodiments wherein some actions may be performed by the base station controller, such as e.g. computations, and some actions by the radio base station, such as e.g. sending and receiving signals, according to some embodiments. The network node arrangement 600 is configured to perform any, some or all of the actions 501-507 for scrambling a timing advance value to be received by a mobile station 120.

The purpose according to some embodiments is to discourage any non-authorized mobile station 120 from making fake access attempts to the network node 110, merely for positioning purpose, i.e. for receiving timing advance values and then determine the geographical position based on one or more such values. Further, embodiments of the arrangement 600 may provide an improved privacy of the (user of the) mobile station 120, against (non-authorized) tracking software, attempting to plot the geographical position of the mobile station 120, without the user's knowledge. In addition, embodiments of the arrangement 600 may provide an improved geographical positioning service for authorized mobile station 120.

The network node 110 and the mobile station 120 may be comprised in a wireless communication system 100, wherein the network node 110 may act as serving base station for the mobile station 120.

For the sake of clarity, any internal electronics or other components of the arrangement 600, not completely indispensable for understanding the method has been omitted from FIG. 6.

In order to perform the actions 501-507 correctly, the arrangement 600 comprises a receiver 610. The receiver 610 is configured to receive a signal from the mobile station 120.

The receiver 610 may further according to some embodiments be configured to receive an establishment-cause value, dedicated for mobile station positioning without access request, from the mobile station 120.

Further, the arrangement 600 comprises a processing circuit 620, configured to estimate the timing advance value for the mobile station 120, to determine an offset value to be added to the estimated timing advance value, and to compute a scrambled timing advance value by adding the determined offset value to the estimated timing advance value.

According to some embodiments, the same offset value may be utilized for scrambling timing advance values for all mobile stations 120 within a cell 130, defined by the network node 110.

The processing circuit 620 may comprise e.g. one or more instances of a Central Processing Unit (CPU), a processing unit, a processor, a microprocessor, or other processing logic that may interpret and execute instructions. The processing circuit 620 may further perform data processing functions for inputting, outputting, and processing of data comprising data buffering and device control functions, such as call processing control, user interface control, or the like.

The processing circuit 620 may further be configured to determine the maximum timing advance value used within the cell 130, to obtain the upper limit of an offset range by subtracting the determined maximum timing advance value from a predetermined value, such as e.g. 63, and to determine the offset value to be an integer between 1 and the upper limit of the offset range.

The processing circuit 620 may further according to some embodiments be configured to determine the offset value randomly, to be valid for a period of time.

The processing circuit 620 may according to some embodiments further be configured to, upon detection of the establishment-cause value, estimate the timing advance value for the mobile station 120 using more than 6 bits, enabling at least 65 distinct timing advance values.

According to some embodiments, the processing circuit 620 may further be configured to, upon detection of an establishment-cause value, determine that no connection attempt is being performed by the mobile station 120 and refrain from allocating resources to the mobile station 120.

The processing circuit 620 may further be configured to iteratively allocate the same resource to mobile stations 120 attempting to access the network node 110, until it is verified that the allocated resource is actually utilized.

According to some embodiments, the arrangement 600 may comprise at least one memory 625. The memory 625 may comprise a physical device utilized to store data or programs i.e. sequences of instructions, on a temporary or permanent basis. According to some embodiments, the memory 625 may comprise integrated circuits consisting of silicon-based transistors. Further, the at least one memory 625 may be volatile or non-volatile. The network node 110 may further according to some embodiments comprise at least one volatile memory 625 and also at least one non-volatile memory 625.

Additionally, the arrangement 600 comprises a transmitter 630, configured to transmit the scrambled timing advance value to the mobile station 120.

Further, it is to be noted that some of the described units 610-630 comprised within the arrangement 600 in the network node 110 are to be regarded as separate logical entities but not with necessity separate physical entities. To mention just one example, the receiver 610 and the transmitter 630 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 110, and the mobile station 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 501-507 to be performed in the network node 110 may be implemented through one or more processing circuits 620 in the network node 110, together with computer program code for performing the functions of the actions 501-507. Thus a computer program product, comprising instructions for performing any, some or all of the actions 501-507 in the network node 110 may schedule wireless transmissions between the network node 110 and a mobile station 120, when being loaded into the one or more processing circuits 420.

The computer program product mentioned above may be provided for instance in the form of a data carrier carrying computer program code for performing at least some of the actions 501-507 according to some embodiments when being loaded into the processing circuit 420. The data carrier may be e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the network node 110 remotely, e.g. over an Internet or an intranet connection.

Figure 7:
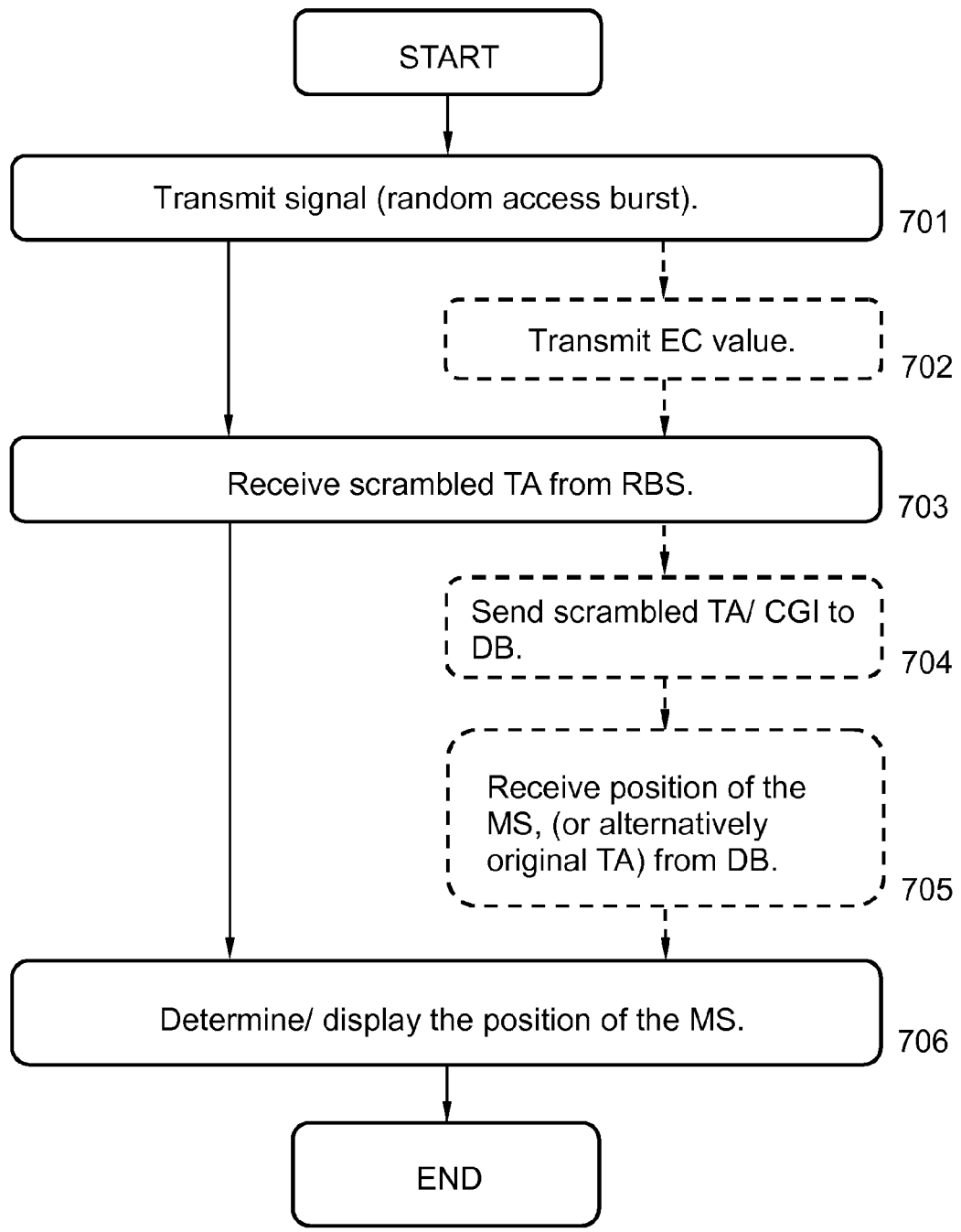
FIG. 7 is a schematic block diagram illustrating a method in a mobile station in a wireless communication system according to some embodiments.

FIG. 7 is a schematic block diagram illustrating an embodiment of the method in a mobile station 120, regarded in perspective of the mobile station 120. The mobile station 120 may be represented by a user equipment or the like. The method aims at utilizing a scrambled timing advance value received from a network node 110. According to some embodiments, the received scrambled timing advance value may be used for determining geographical position of the mobile station 120. The network node 110 and the mobile station 120 are comprised in a wireless communication system 100, wherein the network node 110 may act as serving base station for the mobile station 120.

The purpose according to some embodiments is to discourage any non-authorized mobile station 120 from making fake access attempts to the network node 110, merely for positioning purpose, i.e. for receiving timing advance values and then determine the geographical position based on one or more such value. Further, embodiments of the method may provide an improved privacy of the (user of the) mobile station 120, against (non-authorized) tracking software, attempting to plot the geographical position of the mobile station 120, without the user's knowledge. In addition, embodiments of the method may provide an improved geographical positioning service for authorized mobile station 120. The network node 110 and the mobile station 120 may be comprised in a wireless communication system 100, wherein the network node 110 may act as serving base station for the mobile station 120.

The method comprises a number of actions 701-706, in order to correctly utilizing the scrambled timing advance value. The actions may be performed in a somewhat different chronological order than the enumeration indicates, according to different embodiments. Any, some or all actions, such as e.g. 703 and 706 may be performed simultaneously or in a somewhat rearranged chronological order. The method may comprise the following actions:

Action 701

A signal is transmitted, to be received by the network node 110.

Action 702

This action may be performed within some alternative embodiments.

An establishment-cause value may be transmitted, dedicated for indicating positioning of the mobile station 120, to be received by the network node 110. Thus the network node 110 becomes aware that no access is desired by the mobile station 120.

Action 703

A scrambled timing advance value comprising an offset value added to a timing advance value is received from the network node 110.

Action 704

This action may be performed within some alternative embodiments.

The scrambled timing advance value may be sent to a database 140 according to some embodiments, together with a request for receiving the original timing advance value from the database 140.

An authentication may according to some embodiments be made in order for the mobile station 120 to access the database 140 and obtain the original timing advance value used by the network node 110. The database 140 may comprise, or alternatively consist of e.g. a look-up table which may be stored in a memory device such as a memory, or any other convenient means for storing data, and which is accessible for the mobile station 120. Further, an identification of the network node 110 may be provided, such as e.g. Cell Global Identity (CGI) of the network node 110.

Action 705

This action may be performed within some alternative embodiments.

The original timing advance value may be received from the database 140, according to some embodiments. According to some embodiments may the computed position of the mobile station 120, based on the original timing advance value be received from the database 140.

Action 706

The position of the mobile station 120 is determined, based on the scrambled timing advance value.

The determination of the position of the mobile station 120 may according to some embodiments be further based on the original timing advance value, i.e. the obtained offset value subtracted from the received scrambled timing advance value.

Further, according to some embodiments, the position of the mobile station 120 may be computed by, and received from the database 140. Thus the determination of the position of the mobile station 120 may comprise presenting the position graphically to the user, e.g. on a map on the display of the mobile station 120.

Figure 8:
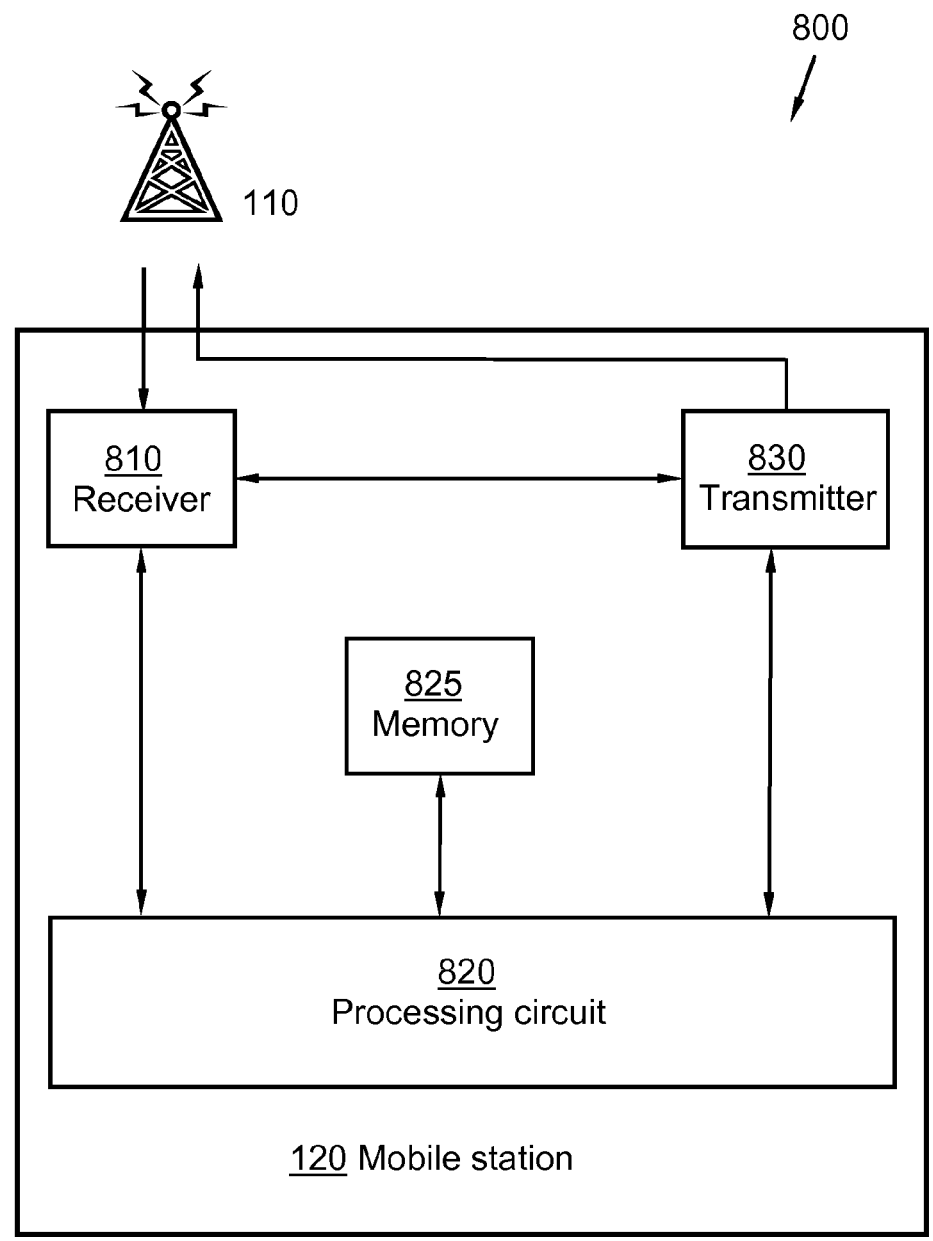
FIG. 8 is a schematic block diagram illustrating an arrangement in a mobile station in a wireless communication system according to some embodiments.

FIG. 8 is a block diagram schematically illustrating an arrangement 800 in a mobile station 120. The mobile station 120 may be represented by e.g. a user equipment or the like. The arrangement 800 aims at utilizing a scrambled timing advance value received from a network node 110. According to some embodiments, the received scrambled timing advance value may be used for determining geographical position of the mobile station 120. The network node 110 and the mobile station 120 are comprised in a wireless communication system 100, wherein the network node 110 may act as serving base station for the mobile station 120.

The mobile station arrangement 800 is configured to perform any, some or all of the actions 701-706 for utilizing a scrambled timing advance value received from a network node 110. The purpose according to some embodiments is to discourage any non-authorized mobile station 120 from making fake access attempts to the network node 110, merely for positioning purpose, i.e. for receiving timing advance values and then determine the geographical position based on one or more such value. Further, embodiments of the method may provide an improved privacy of the (user of the) mobile station 120, against (non-authorized) tracking software, attempting to plot the geographical position of the mobile station 120, without the user's knowledge. In addition, embodiments of the method may provide an improved geographical positioning service for authorized mobile station 120. The network node 110 and the mobile station 120 may be comprised in a wireless communication system 100, wherein the network node 110 may act as serving base station for the mobile station 120.

For the sake of clarity, any internal electronics or other components of the mobile station 120, not completely indispensable for understanding the herein described method has been omitted from FIG. 8.

In order to perform the actions 701-706 correctly, the arrangement 800 comprises a transmitter 830, configured to transmit a signal, to be received by the network node 110.

Further, the arrangement 800 comprises a receiver 810. The receiver 810 is configured to receive a scrambled timing advance value comprising an offset value added to a timing advance value from the network node 110.

In addition, the arrangement 800 further comprises a processing circuit 820, configured to determine the position of the mobile station 120, based on the scrambled timing advance value.

The processing circuit 820 may comprise e.g. one or more instances of a Central Processing Unit (CPU), a processing unit, a processor, a microprocessor, or other processing logic that may interpret and execute instructions. The processing circuit 820 may further perform data processing functions for inputting, outputting, and processing of data comprising data buffering and device control functions, such as call processing control, user interface control, or the like.

According to some embodiments, the arrangement 800 may comprise at least one memory 825. The memory 825 may comprise a physical device utilized to store data or programs i.e. sequences of instructions, on a temporary or permanent basis. According to some embodiments, the memory 825 may comprise integrated circuits consisting of silicon-based transistors. Further, the at least one memory 825 may be volatile or non-volatile. The mobile station 120 may further according to some embodiments comprise at least one volatile memory 825 and also at least one non-volatile memory 825.

The transmitter 830 may further be configured to transmit an establishment-cause value, dedicated for positioning of the mobile station 120, to be received by the network node 110, such that the network node 110 becomes aware that no access is desired by the mobile station 120.

In addition, the transmitter 830 may further be configured to transmit a request to a database 140, for receiving the original timing advance value. Also, the scrambled timing advance value received from the network node 110 may be sent to the database 140, together with an identification of the network node 110, such as e.g. CGI.

The receiver 810 may further be configured to receive the original timing advance value from a database 140 and/or the computed position of the mobile station 120, according to some embodiments.

The processing circuit 820 may further be configured to determine the position of the mobile station 120, based on the original timing advance value, according to some embodiments.

According to some embodiments, the arrangement 800 may be configured to obtain the original timing advance value and or the position from the database 140 to which an authentication has to be made in order for the mobile station 120 to access the database 140 and obtain the original timing advance value, used by the network node 110 and/or the computed position of the mobile station 120.

Further, it is to be noted that some of the described units 810-830 comprised within the mobile station arrangement 800 in the wireless communication system 100 are to be regarded as separate logical entities but not with necessity separate physical entities. To mention just one example, the receiver 810 and the transmitter 830 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the network node 110, and the mobile station 120 may comprise both traffic and control signals e.g. paging signals/messages for incoming calls, which may be used to establish and maintain a voice call communication with another party or to transmit and/or receive data, such as SMS, e-mail or MMS messages, with a remote user equipment, or other node comprised in the wireless communication system 100.

The actions 701-706 to be performed in the mobile station 120 may be implemented through one or more processing circuits 820 in the mobile station 120, together with computer program code for performing the functions of the actions 701-706. Thus a computer program product, comprising instructions for performing the actions 701-706 in the mobile station 120 may utilize a scrambled timing advance value received from a network node 110, when being loaded into the one or more processing circuits 820.

The computer program product mentioned above may be provided for instance in the form of a data carrier carrying computer program code for performing at least some of the actions 701-706 according to some embodiments when being loaded into the processing circuit 820. The data carrier may be e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the mobile station 120 remotely, e.g. over an Internet or an intranet connection.

Figure 9:
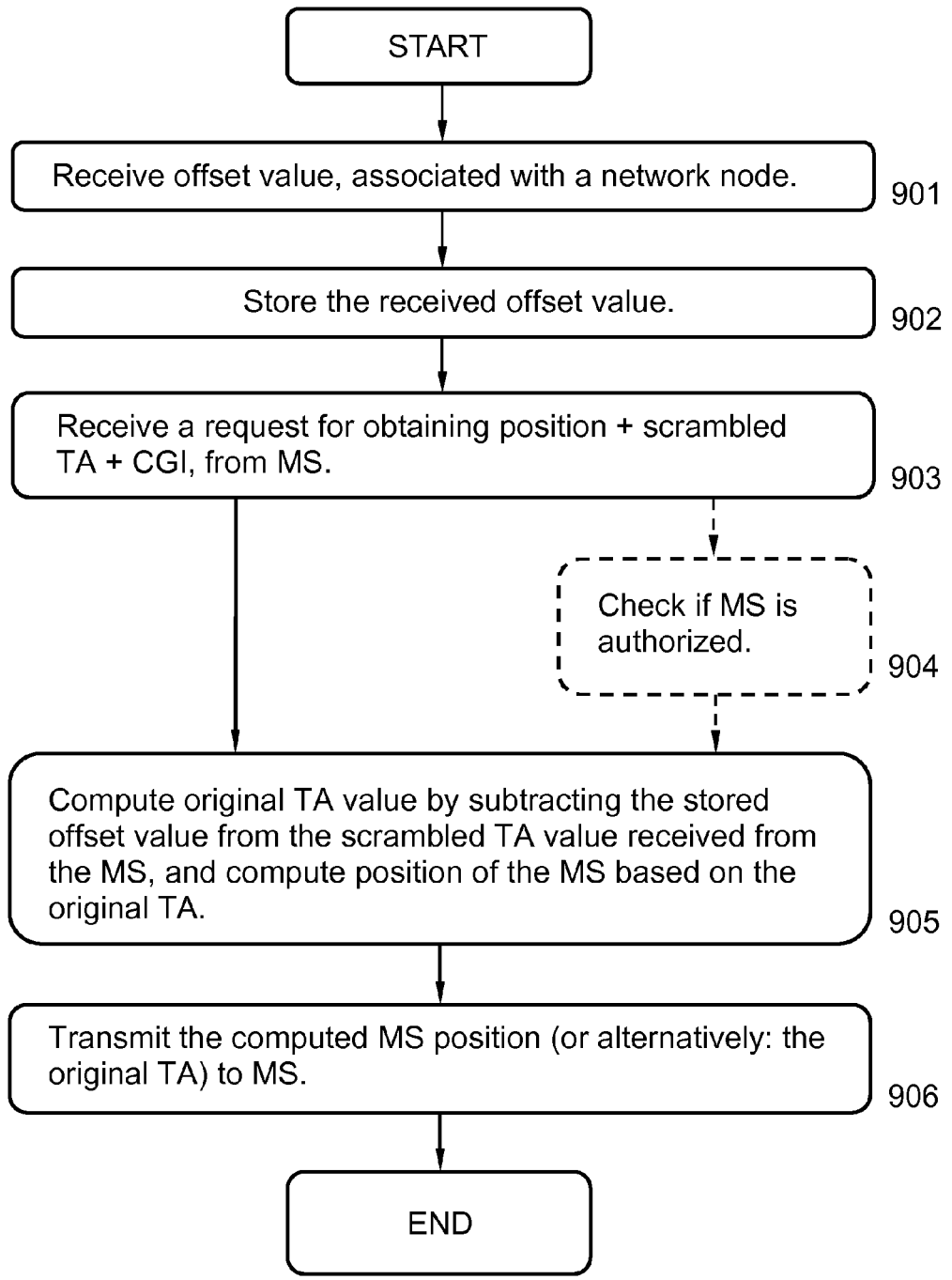
FIG. 9 is a schematic block diagram illustrating a method in a database in a wireless communication system according to some embodiments.

FIG. 9 is a schematic block diagram illustrating an embodiment of the method in a database 140 for providing an original timing advance value, and/or a position of a mobile station 120, to the mobile station 120. The database 140 may be accessible to the network node 110 and/or the mobile station 120. The purpose according to some embodiments may be to discourage any non-authorized mobile station 120 from making fake access attempts to the network node 110, merely for positioning purpose, i.e. for receiving timing advance values and then determine the geographical position based on one or more such value. Further, embodiments of the method may provide an improved privacy of the (user of the) mobile station 120, against (non-authorized) tracking software, attempting to plot the geographical position of the mobile station 120, without the user's knowledge. In addition, embodiments of the method may provide an improved geographical positioning service for authorized mobile station 120. The network node 110 and the mobile station 120 may be comprised in a wireless communication system 100, wherein the network node 110 may act as serving base station for the mobile station 120.

The method comprises a number of actions 901-906, in order to correctly provide the original timing advance value to the authorized mobile station 120. The actions may be performed in a somewhat different chronological order than the enumeration indicates, according to different embodiments. Any, some or all actions, such as e.g. 902 and 903 may be performed simultaneously or in a somewhat rearranged chronological order. The method may comprise the following actions:

Action 901

An offset value, associated with a network node 110 is received from the network node 110.

According to some embodiments may the offset value be updated at some regular or randomly selected interval, to further enhance the risk of leakage of valid offset values, or rather to limit the use of such leaked valid offset values, in time.

Action 902

The received offset value is stored in the database 140. The offset value may be stored in association with the network node 110, such that a search in the database using the identity of the network node 110 as entrance value, render a hit on the associated offset value. The association may be made with the CGI of the network node 110, according to some embodiments.

Action 903

A request for converting a scrambled timing advance value into the original timing advance value is received from the mobile station 120.

According to some embodiments, an authentication of the mobile station 120 may be performed. Thus the mobile station 120 may provide some kind of identification value such as e.g. the International Mobile Subscriber Identity (IMSI), International Mobile Equipment Identity (IMEI), Mobile Subscriber Integrated Services Digital Network Number (MSISDN) or other similar and/or corresponding device unique value which may serve the purpose of identifying/authenticating the mobile station 120 and/or the user of the mobile station 120.

The request received from the mobile station 120 may comprise the scrambled timing advance value that the mobile station 120 has received from the network node 110, as well as an identification of the network node 110, according to some embodiments. The provided identification of the network node 110 may comprise e.g. Cell Global Identity (CGI) of the network node 110.

Action 904

This action may be performed within some alternative embodiments.

A check may be performed, for checking if the mobile station 120 is authorized to receive the original timing advance value and/or the computed position of the mobile station 120 based on the original timing advance value. The check may e.g. be made by parsing the identity of the mobile station 120 and/or the user of the mobile station 120 against a register over authorized users.

Action 905

The original timing advance value is computed by subtracting the stored offset value associated with the network node 110 from the scrambled timing advance value received from the mobile station 120.

The computation of the original timing advance value and/or position of the mobile station 120 may according to some embodiments be performed only if the mobile station 120 is authorized.

Action 906

The computed original timing advance value is transmitted to the mobile station 120. alternatively, according to some embodiments is the computed position of the mobile station 120 transmitted to the mobile station 120.

The transmission of the original timing advance value and/or position of the mobile station 120 may according to some embodiments be performed only if the mobile station 120 is authorized.

Figure 10:
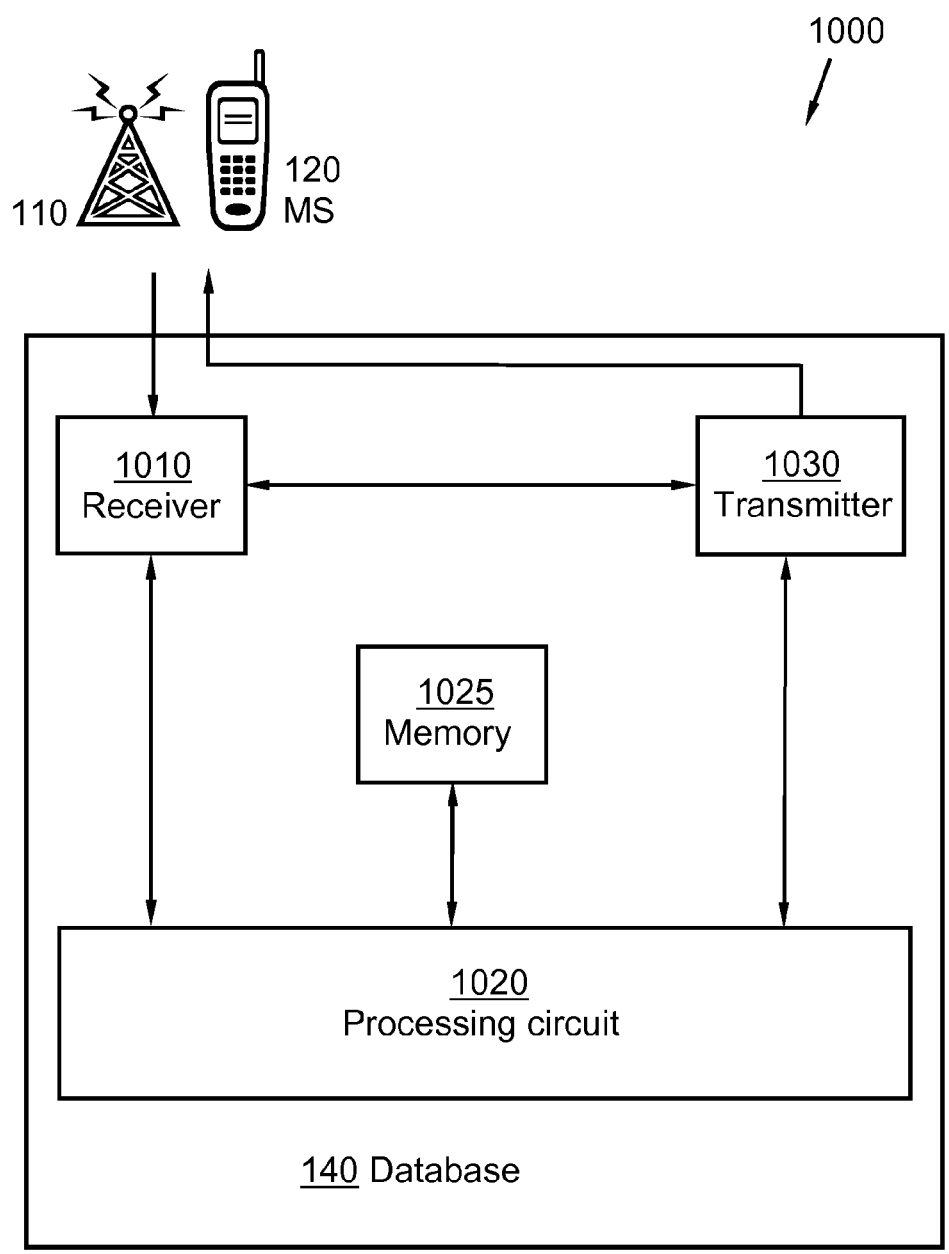
FIG. 10 is a schematic block diagram illustrating an arrangement in a database in a wireless communication system according to some embodiments.

FIG. 10 is a block diagram schematically illustrating an arrangement 1000 in a database 140 for providing an original timing advance value and/or position of a mobile station 120, to the mobile station 120. The database 140 may be accessible to the network node 110 and/or the mobile station 120. The purpose according to some embodiments may be to discourage any non-authorized mobile station 120 from making fake access attempts to the network node 110, merely for positioning purpose, i.e. for receiving timing advance values and then determine the geographical position based on one or more such value. Further, embodiments of the method may provide an improved privacy of the (user of the) mobile station 120, against (non-authorized) tracking software, attempting to plot the geographical position of the mobile station 120, without the user's knowledge. In addition, embodiments of the method may provide an improved geographical positioning service for authorized mobile station 120. The network node 110 and the mobile station 120 may be comprised in a wireless communication system 100, wherein the network node 110 may act as serving base station for the mobile station 120.

The database arrangement 1000 is configured to perform any, some or all of the actions 901-906 for providing an original timing advance value and/or position, to the mobile station 120.

For the sake of clarity, any internal electronics or other components of the database 140, not completely indispensable for understanding the herein disclosed method has been omitted from FIG. 10.

In order to perform the actions 901-906 correctly, the arrangement 1000 comprises a receiver 1010, configured to receive an offset value, associated with a network node 110. The receiver 1010 is further configured to receive a request for converting a scrambled timing advance value into the original timing advance value and/or requesting the position of the mobile station 120, from the mobile station 120.

Further, the arrangement 1000 comprises a processing circuit 1020. The processing circuit 1020 is configured to compute the original timing advance value by subtracting the stored offset value associated with the network node 110 from the scrambled timing advance value received from the mobile station 120.

The processing circuit 1020 may comprise e.g. one or more instances of a Central Processing Unit (CPU), a processing unit, a processor, a microprocessor, or other processing logic that may interpret and execute instructions. The processing circuit 1020 may further perform data processing functions for inputting, outputting, and processing of data comprising data buffering and device control functions, such as call processing control, user interface control, or the like.

In addition, the arrangement 1000 comprises a memory 1025, configured to store the received offset value. The memory 1025 may according to some embodiments be configured to store the identity of the network node 110, the identity of authorized mobile stations 120 and/or users of mobile stations 120.

According to some embodiments, the arrangement 1000 may comprise at least one memory 1025. The memory 1025 may comprise a physical device utilized to store data or programs i.e. sequences of instructions, on a temporary or permanent basis. According to some embodiments, the memory 1025 may comprise integrated circuits consisting of silicon-based transistors. Further, the at least one memory 1025 may be volatile or non-volatile. The database 140 may further according to some embodiments comprise at least one volatile memory 1025 and also at least one non-volatile memory 1025.

Also, the arrangement 1000 comprises a transmitter 1030. The transmitter 1030 is configured to transmit the computed original timing advance value and/or computed position of the mobile station 120, to the mobile station 120.

For the sake of clarity, any internal electronics or other components of the database 140, not completely indispensable for understanding the herein disclosed method has been omitted from FIG. 10.

Further, it is to be noted that some of the described units 1010-1030 comprised within the database arrangement 1000 in the wireless communication system 100 are to be regarded as separate logical entities but not with necessity separate physical entities. To mention just one example, the receiver 1010 and the transmitter 1030 may be comprised or co-arranged within the same physical unit.

The actions 901-906 to be performed in the database 140 may be implemented through one or more processing circuits 1020 in the database 140, together with computer program code for performing the respective functions of the actions 901-906. Thus a computer program product, comprising instructions for performing the actions 901-906 in the database 140 may provide an original timing advance value and/or position, to a mobile station 120, when being loaded into the one or more processing circuits 1020.

The computer program product mentioned above may be provided for instance in the form of a data carrier carrying computer program code for performing at least some of the actions 901-906 according to some embodiments when being loaded into the processing circuit 1020. The data carrier may be e.g. a hard disk, a CD ROM disc, a memory stick, an optical storage device, a magnetic storage device or any other appropriate medium such as a disk or tape that may hold machine readable data. The computer program product may furthermore be provided as computer program code on a server and downloaded to the database 140 remotely, e.g. over an Internet or an intranet connection.

The terminology used in the disclosure of the exemplary embodiments illustrated in the accompanying drawings is not intended to be limiting of the methods and arrangements.

As used herein, the singular forms "a", an and "the" are intended to comprise the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it may be directly connected or coupled to the other element or intervening elements may be present. Furthermore, "connected" or "coupled" as used herein may comprise wirelessly connected or coupled. As used herein, the term "and/or" includes any and all combinations of one or more of the associated listed items.

The invention claimed is:

1. A method, in a network node, for scrambling a timing advance value to be received by a mobile station, comprising:
receiving a signal from the mobile station;
estimating a timing advance value for the mobile station;
determining an offset value to be added to the estimated timing advance value, wherein determining the offset value comprises determining the offset value randomly, to be valid for a period of time;
computing a scrambled timing advance value by adding the determined offset value to the estimated timing advance value; and
transmitting the scrambled timing advance value to be received by the mobile station.

2. The method of claim 1:
wherein the same offset value is utilized for scrambling the timing advance values for all mobile stations within a cell defined by the network node; and
wherein determining the offset value comprises:
determining a maximum timing advance value used within the cell;
obtaining an upper limit of an offset range by subtracting the determined maximum timing advance value from a predefined value; and
determining the offset value to be an integer between 1 and the upper limit of the offset range.

3. The method of claim 2, wherein the predefined value utilized for obtaining the upper limit of the offset range is 63.

4. The method of claim 1, further comprising:
receiving an establishment-cause value, dedicated to a mobile station positioning without access request, from the mobile station; and
upon detection of the establishment-cause value, determining that no connection attempt is being performed by the mobile station and refraining from allocating resources to the mobile station.

5. The method of claim 1, further comprising iteratively allocating the same resource to mobile stations attempting to access the network node, until it is verified that the allocated resource is actually utilized.

6. A method, in a network node, for scrambling a timing advance value to be received by a mobile station, comprising:
receiving a signal from the mobile station;
estimating a timing advance value for the mobile station;
determining an offset value to be added to the estimated timing advance value, wherein determining the offset value comprises determining the offset value randomly, to be valid for a period of time;
computing a scrambled timing advance value by adding the determined offset value to the estimated timing advance value;
transmitting the scrambled timing advance value to be received by the mobile station;
receiving an establishment-cause value, dedicated to a mobile station positioning without access request, from the mobile station; and
upon detection of the establishment-cause value:
determining that no connection attempt is being performed by the mobile station and refraining from allocating resources to the mobile station; and
estimating the timing advance value for the mobile station using more than 6 bits to enable at least 65 distinct timing advance values.

7. A network node operative to scramble a timing advance value to be received by a mobile station, comprising:
a receiver configured to receive a signal from a mobile station;
a processing circuit configured to:
estimate a timing advance value for the mobile station;
determine an offset value to be added to the estimated timing advance value; and
compute a scrambled timing advance value by adding the determined offset value to the estimated timing advance value; and
a transmitter configured to transmit the scrambled timing advance value to be received by the mobile station;
wherein the processing circuit is configured to determine the offset value randomly, to be valid for a period of time.

8. The network node of claim 7:
wherein the same offset value is utilized for scrambling the timing advance values for all mobile stations within a cell defined by the network node;
wherein to determine the offset value, the processing circuit is configured to:
determine a maximum timing advance value used within the cell;
obtain an upper limit of an offset range by subtracting the determined maximum timing advance value from 63; and
determine the offset value to be an integer between 1 and the upper limit of the offset range.

9. The network node of claim 7:
wherein the receiver is further configured to receive an establishment-cause value, dedicated to a mobile station positioning without access request, from the mobile station; and
wherein the processing circuit is further configured to, upon detection of the establishment-cause value, determine that no connection attempt is being performed by the mobile station and refrain from allocating resources to the mobile station.

10. The network node of claim 7 wherein the processing circuit is further configured to iteratively allocate the same resource to mobile stations attempting to access the network node, until it is verified that the allocated resource is actually utilized.

11. A network node operative to scramble a timing advance value to be received by a mobile station, comprising:
a receiver configured to receive a signal from a mobile station;
a processing circuit configured to:
estimate a timing advance value for the mobile station;
determine an offset value to be added to the estimated timing advance value; and compute a scrambled timing advance value by adding the determined offset value to the estimated timing advance value; and a transmitter configured to transmit the scrambled timing advance value to be received by the mobile station;

wherein the processing circuit is configured to determine the offset value randomly, to be valid for a period of time; and wherein the processing circuit is further configured to, upon detection of the establishment-cause value, estimate the timing advance value for the mobile station using more than 6 bits to enable at least 65 distinct timing advance values.

12. A method in a mobile station for utilizing a scrambled timing advance value received from a network node, comprising:

transmitting a signal to be received by the network node;

receiving a scrambled timing advance value comprising an offset value added to a timing advance value from the network node;

determining the position of the mobile station, based on the scrambled timing advance value;

sending the scrambled timing advance value, received from the network node, to a database to enable computation of an original timing advance value at the database, and to enable computation of the position of the mobile station, based on the original timing advance value; and receiving either the computed position of the mobile station or the original timing advance value from the database;

wherein the determination of the position of the mobile station is further based on the original timing advance value if the position of the mobile station is not received from the database.

13. The method of claim 12, further comprising transmitting an establishment-cause value, dedicated to positioning of the mobile station, to be received by the network node, such that the network node becomes aware that no access is desired by the mobile station.

14. The method of claim 12, further comprising authenticating the mobile station in order to receive the original timing advance value or the computed position of the mobile station from the database.

15. A mobile station operative to utilize a scrambled timing advance value received from a network node, comprising:

a transmitter configured to transmit a signal to be received by the network node;

a receiver configured to receive, from the network node, a scrambled timing advance value comprising an offset value added to a timing advance value; and a processing circuit configured to determine the position of the mobile station based on the scrambled timing advance value;

wherein the transmitter is further configured to send the scrambled timing advance value, received from the network node, to a database to enable computation of an original timing advance value at the database, and to enable computation of the position of the mobile station, based on the original timing advance value;

wherein the receiver is further configured to receive either the computed position of the mobile station or the original timing advance value from the database; and wherein the determination of the position of the mobile station is further based on the original timing advance value if the position of the mobile station is not received from the database.

16. The mobile station of claim 15, wherein the transmitter is further configured to transmit an establishment-cause value, dedicated to positioning of the mobile station, to be received by the network node, such that the network node becomes aware that no access is desired by the mobile station.

17. The mobile station of claim 15:

wherein the receiver is further configured to receive an original timing advance value, the computed position of the mobile station, or both, from a database; and wherein the processing circuit is further configured to perform at least one of the following:

determine the position of the mobile station based on the original timing advance value; and present the computed position of the mobile station.

18. The mobile station of claim 17, wherein the original timing advance value is received from a database for which authentication is required in order for the mobile station to obtain the original timing advance value used by the network node, or the computed position of the mobile station, from the database.

* * * * *